United States Patent [19]

O'Toole et al.

[11] Patent Number: 5,509,988
[45] Date of Patent: Apr. 23, 1996

[54] METHOD OF AFFIXING MATERIAL ON A SUBSTRATE TO THE INNER SURFACE OF A TUBE

[75] Inventors: Joseph A. O'Toole, Massapequa; Douglas W. Sedgley, Bethpage, both of N.Y.

[73] Assignee: Northrop Grumman Corporation, Los Angeles, Calif.

[21] Appl. No.: 252,744

[22] Filed: Jun. 2, 1994

[51] Int. Cl.$^6$ .................................................. B29C 63/26
[52] U.S. Cl. .......................... 156/220; 156/221; 156/287; 156/294; 29/522.1; 264/269
[58] Field of Search ..................................... 156/293, 294, 156/287, 220, 221; 29/522.1, 523; 264/269

[56] References Cited

U.S. PATENT DOCUMENTS

| | | | |
|---|---|---|---|
| 2,312,993 | 3/1943 | Stephens | 156/287 |
| 3,156,042 | 4/1962 | Reed | 29/523 |

Primary Examiner—Michael W. Ball
Assistant Examiner—Sam Chuan Yao
Attorney, Agent, or Firm—Terry J. Anderson; Karl J. Hoch, Jr.

[57] ABSTRACT

A method of affixing a material on a substrate to the inner surface of a bore tube of magnets for a superconducting supercollider includes the steps of bonding a gas-absorbing material to a thin metallic substrate and forming the substrate and the material into a partly tubular configuration having an inner surface and an outer surface, the material being on the inner surface. The partly tubular configuration is shaped in a manner whereby the partly tubular configuration is expandable in diameter. The partly tubular configuration is inserted coaxially into the tube with the outer surface of the partly tubular configuration in proximity with the inner surface of the tube. Hoop compressor stress is applied to the inner surface of the partly tubular configuration, thereby forcing the partly tubular configuration against the inner surface of the tube. The bore tube is maintained at cryogenic temperature.

11 Claims, 13 Drawing Sheets

METHOD OF AFFIXING MATERIAL ON A SUBSTRATE TO THE INNER SURFACE OF A TUBE

BACKGROUND OF THE INVENTION

1. Field of the Invention

The present invention relates to a method and device for affixing a material on a substrate to the inner surface of a tube. More particularly, the invention relates to a method and device for affixing a gas-absorbent material on a substrate to the inner surface of the bore tube of magnets for a superconducting supercollider.

It is sometimes necessary or desirable to pump particles in particle devices of various types, including the bore tube of a particle accelerator. The pumping may be accomplished by placing a suitable gas-absorbent material such as, for example, charcoal, in the area to be pumped. The gas-absorbent material, to function properly, must be maintained at a temperature near 4 degrees Kelvin. This is commonly achieved by bonding with an adhesive the gas-absorbent material to a metallic surface which is cooled to a cryogenic temperature. It is extremely difficult to apply the adhesive and the gas-absorbent material and to inspect the application when these operations must be undertaken in the bore tube of superconducting magnets such as, for example, the bore tube of magnets for a superconducting supercollider.

The principal object of the invention is to provide a method and device for affixing either a material, or a material on a substrate, to the inner surface of a tube efficiently and reliably.

An object of the invention is to provide a method and device for affixing either a gas-absorbing material, or a gas-absorbing material on a substrate, to the inner surface of the bore tube of a particle accelerator with facility and convenience.

Another object of the invention is to provide a method and device for affixing either a gas-absorbing material, or a gas-absorbing material on a substrate, to the inner surface of the bore tube of magnets for a superconducting supercollider, rapidly and reliably.

BRIEF SUMMARY OF THE INVENTION

In accordance with the invention, a method of affixing a material on a substrate to the inner surface of a tube comprises the step of bonding the material to the substrate. The substrate and the material are formed into a substantially tubular configuration having an inner surface and an outer surface, the material being on the inner surface. The tubular configuration is shaped in a manner whereby the tubular configuration is expandable in diameter. The tubular configuration is inserted substantially coaxially into the tube with the outer surface of the tubular configuration in proximity with the inner surface of the tube. Hoop compression stress is applied to the inner surface of the tubular configuration, thereby forcing the tubular configuration against the inner surface of the tube.

A gas-absorbing material is bonded to the inner surface of the tubular configuration. The tube is the bore tube of magnets for a superconductivity supercollider. The substrate is a thin metallic substrate. The material usually consists of charcoal and the bore tube is maintained at cryogenic temperature.

In accordance with the invention, a method of pumping particles in a tube of a particle device comprises the step of bonding a gas-absorbent material to a substrate. The substrate and the material are formed into a substantially tubular configuration having an inner surface and an outer surface, the material being on the inner surface. The tubular configuration is shaped in a manner whereby the tubular configuration is expandable in diameter. The tubular configuration is inserted substantially coaxially into the tube with the outer surface of the tubular configuration in proximity with the inner surface of the tube. Hoop compression stress is applied to the inner surface of the tubular configuration, thereby forming the tubular configuration against the inner surface of the tube.

In one embodiment, the tubular configuration is shaped with convolutions therein, thereby providing the tubular configuration with diametrical expandability. In another embodiment, the tubular configuration is formed with louver type notches formed therein and convolutes extending from the notches, thereby providing the tubular configuration with diametrical expandability. In such case, the tubular configuration is formed with tabs engaging the convolutes for locking into the louver type notches.

In accordance with the invention, a method of affixing a material on a substrate to the inner surface of a tube comprises the step of bonding the material to the substrate. The substrate and the material are formed into substantially curved sections, each having an inner surface and an outer surface, the material being on the inner surface of the sections. The sections are shaped to approximately the inner surface of the tube. Adhesive is applied to the outer surfaces of the sections. The sections are inserted into the tube in angularly spaced relation to each other with the outer surfaces of the sections in proximity with the inner surface of the tube. The sections are pressed to the inner surface of the tube, thereby adhering the outer surfaces of the sections to the inner surface of the tube.

The substrate is a thin metallic substrate and is formed into two curved sections in spaced diametrically opposed relation. A gas-absorbing material is bonded to the inner surface of the sections and the tube is the bore tube of magnets for a superconducting supercollider. The material usually consists of charcoal. The bore tube is maintained at cryogenic temperature and the pressing of the sections to the bore tube is released.

In accordance with the invention, a material applicator device for affixing a material to the inner surface of a tube comprises a carriage having wheels thereon for moving the carriage forward and backward. Adhesive applying means on the carriage applies adhesive to the inner surface of the tube in coordination with motion of the carriage. Material applying means on the carriage applies the adhesive and presses the material into the adhesive on the inner surface of the tube.

Propulsion means on the carriage moves it through the tube and guide means within the tube guides the carriage. Heating means on the carriage aids curing of the adhesive and vacuum means removes loose material from the tube. The adhesive applying means is adjustably coupled to a wheel of the carriage and adjustably dispenses adhesive in accordance with motion of the carriage. The material applying means is adjustably coupled to a wheel of the carriage and adjustably dispenses material in accordance with motion of the carriage. The adhesive applying means includes a cartridge of adhesive and a plunger for pushing the adhesive out of the cartridge onto the inner surface of the tube. The material applying means includes a cartridge of the material and a plunger for pushing the material out of the cartridge onto the adhesive on the inner surface of the tube.

In accordance with the invention, a material applicator device for affixing a material to the inner surface of a tube comprises a hose having material therein extending through the tube with an end of the hose in the tube. Adhesive applying means at the end of the hose in the tube applies adhesive to the inner surface of the tube. Withdrawing means withdraws the hose from the tube, thereby supplying material from the hose to the inner surface of the tube.

The adhesive applying means has a substantially cylindrical housing transverse to the hose. The withdrawing means withdraws the hose from the tube at a variable speed, thereby adjusting the rate of flow of adhesive from the adhesive applying means.

BRIEF DESCRIPTION OF THE DRAWINGS

Other objects and features of the present invention will become apparent from the following detailed description considered in connection with the accompanying drawings which disclose the embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
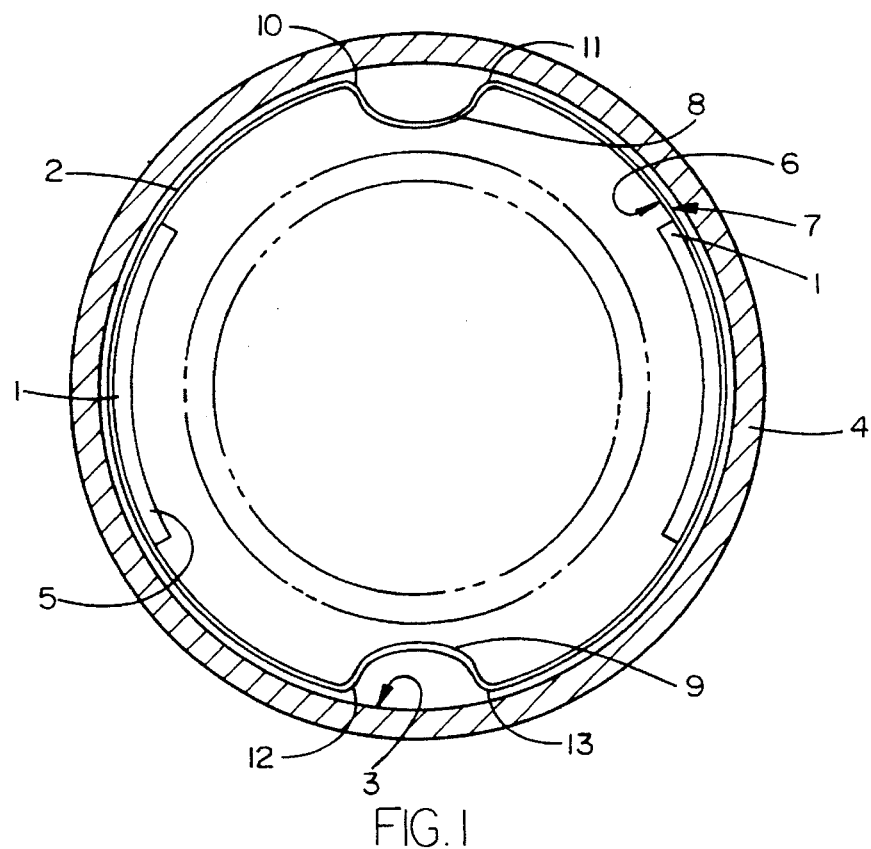
FIG. 1 is an axial sectional view of a tube illustrating a first embodiment of the method of the invention of affixing a material, disposed on a substrate, to the inner surface of a tube, with the substrate and material in position.
Figure 2:
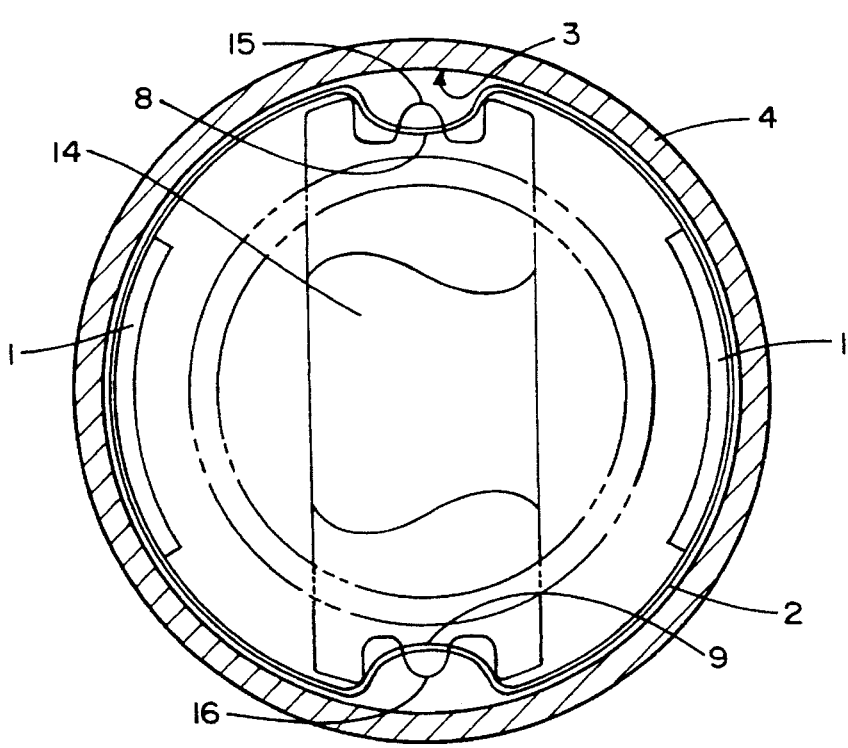
FIG. 2 is an axial sectional view of a tube illustrating the first embodiment of the method of FIG. 1, with a compression stress tool in position.

The first embodiment of the method of affixing a material 1 such as, for example, a gas-absorbent material, such as charcoal, on a thin metallic substrate 2 to the inner surface 3 of a tube 4 is shown in FIGS. 1 to 4. This method and device are usable in a superconducting supercollider bore tube pumping operation and are also usable in similar situations where access is limited. The charcoal 1 is bonded to the thin metallic substrate 2. The bonded charcoal 1 and substrate 2 are then formed into a substantially partly tubular configuration 5 having an inner surface 6 and an outer surface 7. As shown in the drawings, the gas-absorbent material 1 is on the inner surface 6 of the partly tubular configuration.

The partly tubular configuration 5 is shaped to be expandable in diameter, as shown in the FIGS. This is accomplished in the first embodiment by a pair of 180 degree opposite formed areas. These areas have curves 8 and 9, respectively, toward the axis of the tube 4. The partly tubular configuration 5 is convoluted at both sides of each of curves 8 and 9. Thus, convolutes 10 and 11 on both sides of the curve 8 function as springs along the sides of the area of said curve and convolutes 12 and 13 on both sides of the curve 9 function as springs along the sides of the area of said latter curve.

Figure 3:
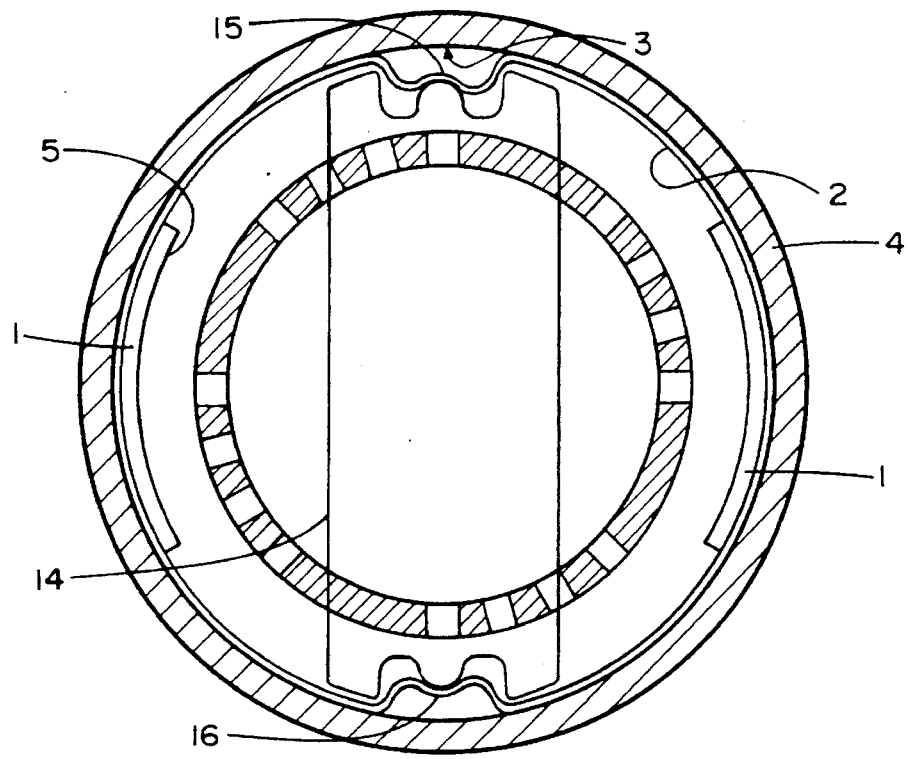
FIG. 3 is an axial sectional view of a tube illustrating the first embodiment of the method of FIG. 1, with the compression stress tool applying stress.
Figure 4:
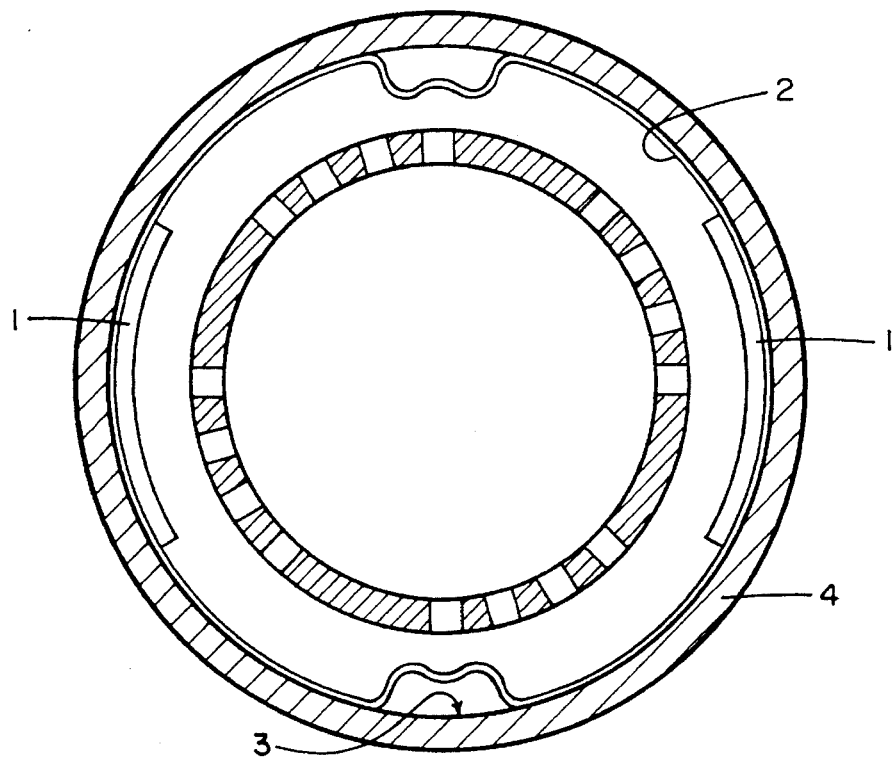
FIG. 4 is an axial sectional view of a tube illustrating the first embodiment of the method of FIG. 1, with the substrate and material installed.

The partly tubular configuration 5 is inserted substantially coaxially into tube 4. The outer surface 7 of the partly tubular configuration 5 is placed in proximity with the inner surface 3 of the tube 4. A tool 14 (FIGS. 2 and 3) is moved through the center of the tube 4. The tool 14 has central parts 15 and 16 which push the central curved areas 8 and 9, respectively, of the substrate 2 toward the inner surface 3 of the tube 4. Hoop compression stress is applied to the inner surface 6 of the partly tubular configuration 5, thereby forcing said partly tubular configuration tightly against the inner surface 3 of the tube 4, as shown in FIG. 4. After sufficient deformation of the curved areas 8 and 9 by the tool 14, expanding the tubular configuration 5 into content with the inner surface 3 of the tube 4, said curved areas snap radially outwardly as shown in FIG. 3 and 4 and are held by the action of the spring forces along their sides caused by the convolutes 10, 11, 12 and 13.

The tool 14 is guided along the convolutes 10, 11, 12 and 13 on each side of each curved area 8 and 9. The stress in the two curved areas 8 and 9 is sufficient to develop the hoop compression required to hold the partly tubular configuration 5 against the inner surface 3 of the tube 4. A second tool (not shown in the FIGS.) would be used to unsnap the partly tubular configuration 5 if it were necessary to remove the substrate 2. Such a tool would deform each pair of convolutes 10 and 11, and 12 and 13, pulling them apart sufficiently to relieve the spring load on the central curved areas 8 and 9, respectively. The curved areas 8 and 9 would then snap back to their original configurations, curved toward the axis or center of the partial tube 5.

The thin metallic substrate 2 is pressed into sufficient contact with the inner surface 3 of the tube 4 such that said substrate and the material 1 reach the temperature of said tube which is at cryogenic temperature.

The second embodiment of the method of affixing the material 1 on a thin metallic substrate 2 to the inner surface 3 of a tube 4 is shown in FIGS. 5 to 10. The second embodiment is the same as the first embodiment (FIGS. 1 to 4), with the exception that in the second embodiment the substrate expanding features are different in that the partly tubular configuration 5 is double convoluted at both sides of each of curves 20 and 21. Thus, a pair of double convolutes 22, 23 and 24, 25 on both sides of the curve 20 function as springs along the sides of the area of said curve. A pair of double convolutes 26, 27 and 28, 29 on both sides of the curve 21 function as springs along the sides of the area of said curve.

Figure 5:
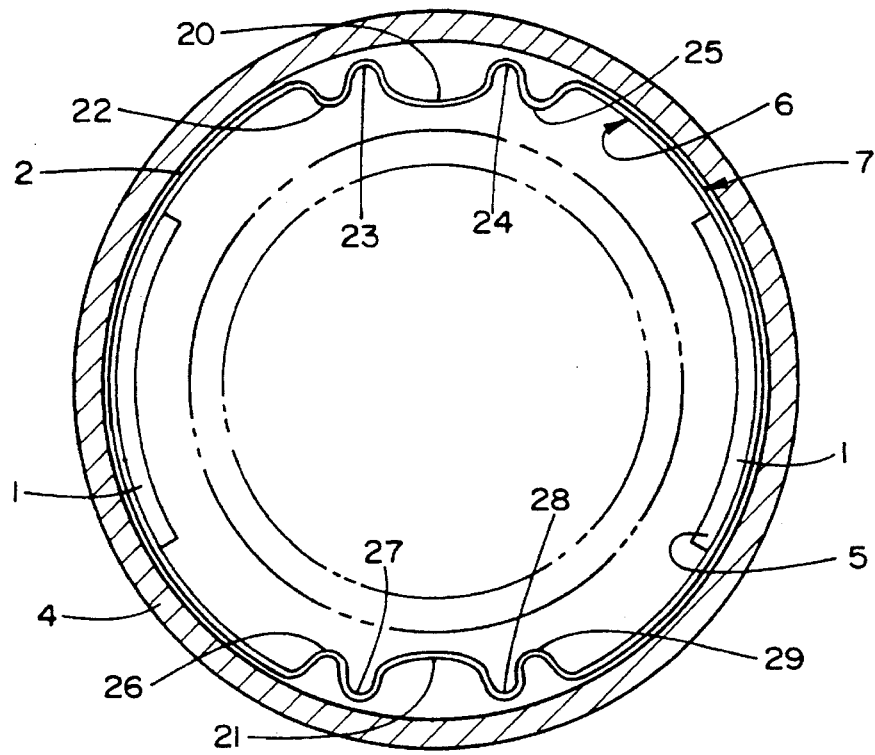
FIG. 5 is an axial sectional view of a tube illustrating a second embodiment of the method of the invention of affixing a material on a substrate to the inner surface of a tube, with the substrate and material in position.
Figure 6:
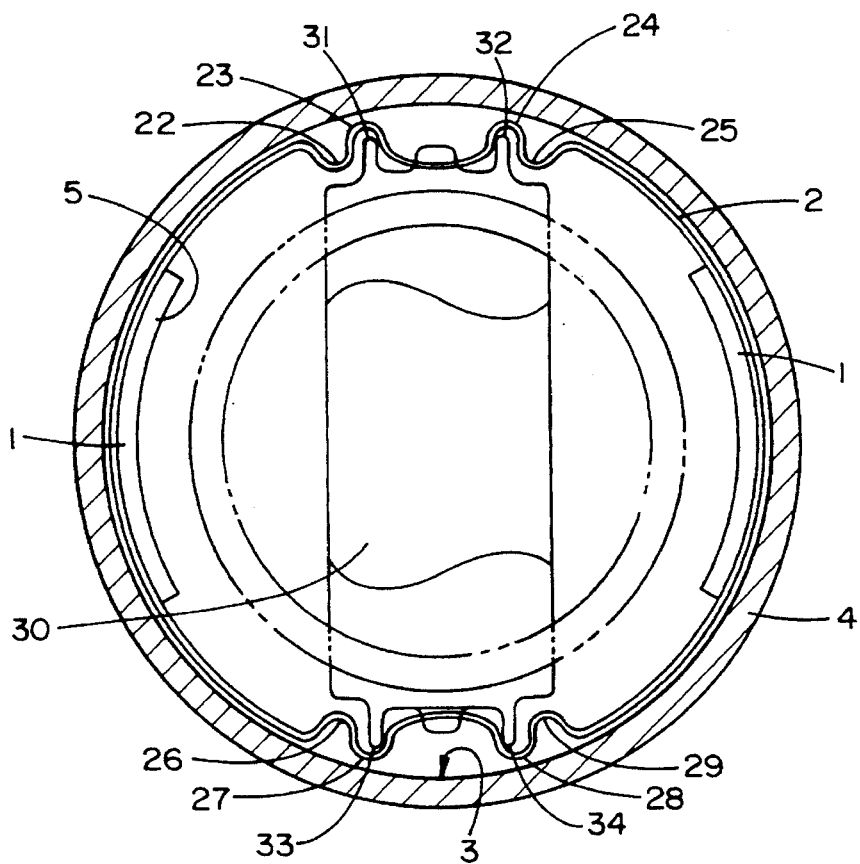
FIG. 6 is an axial sectional view of a tube illustrating the second embodiment of the method of FIG. 5, with a compression stress tool in position.
Figure 7:
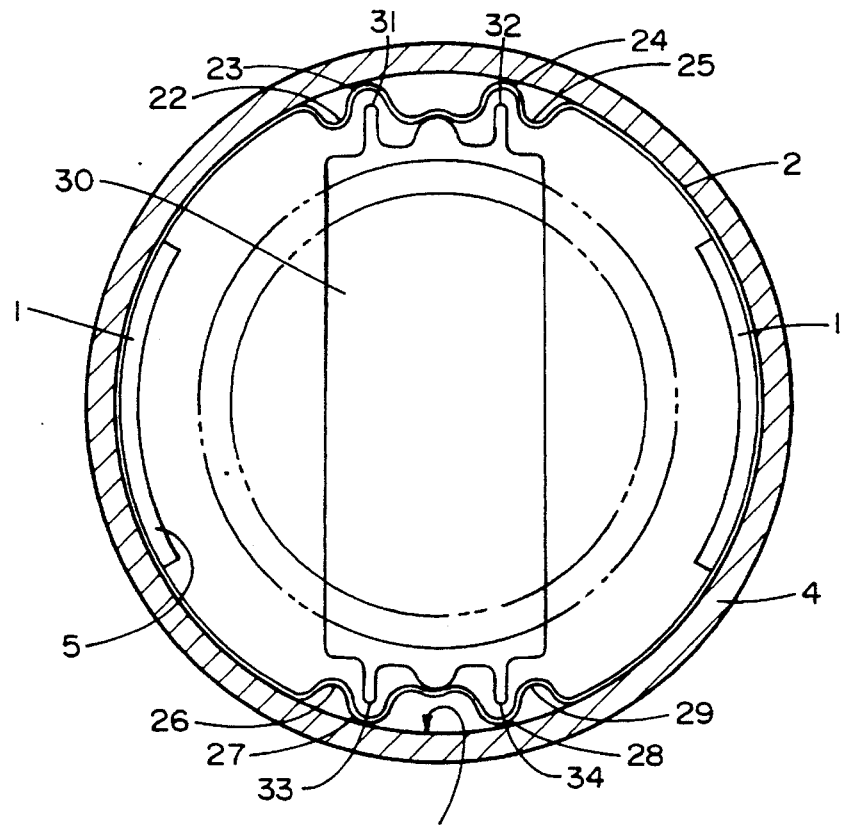
FIG. 7 is an axial sectional view of a tube illustrating the second embodiment of the method of FIG. 5, with the compression stress tool applying stress.
Figure 8:
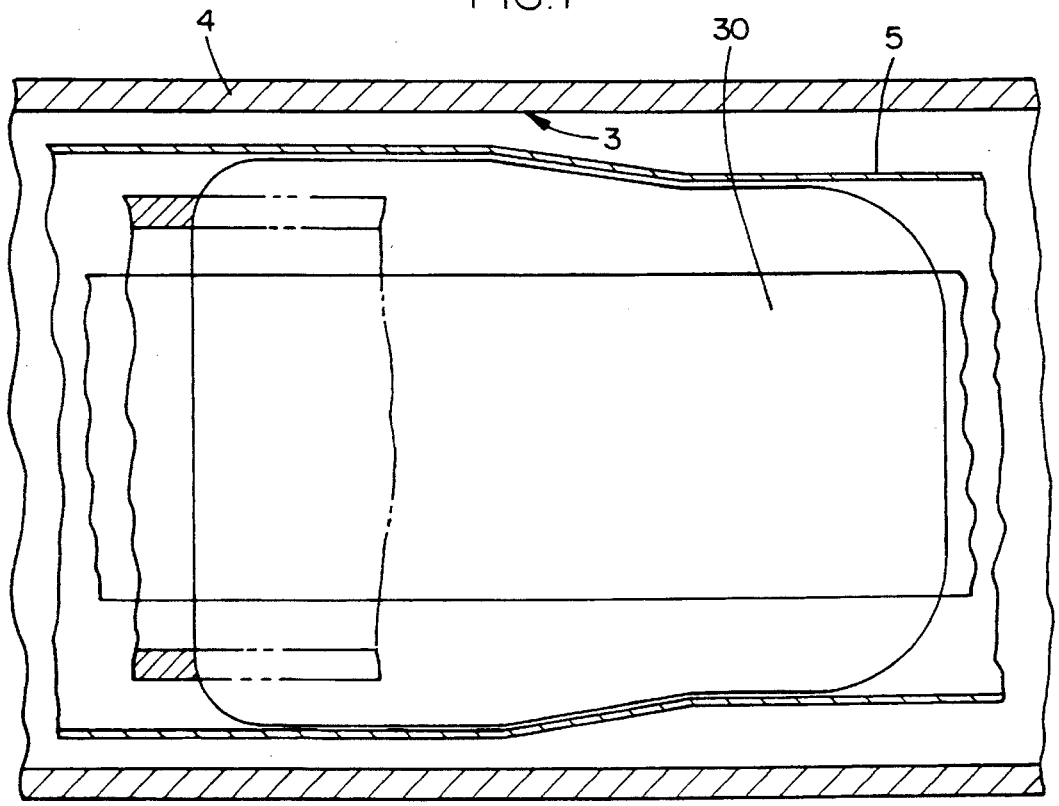
FIG. 8 is a longitudinal sectional view of FIG. 7.
Figure 9:
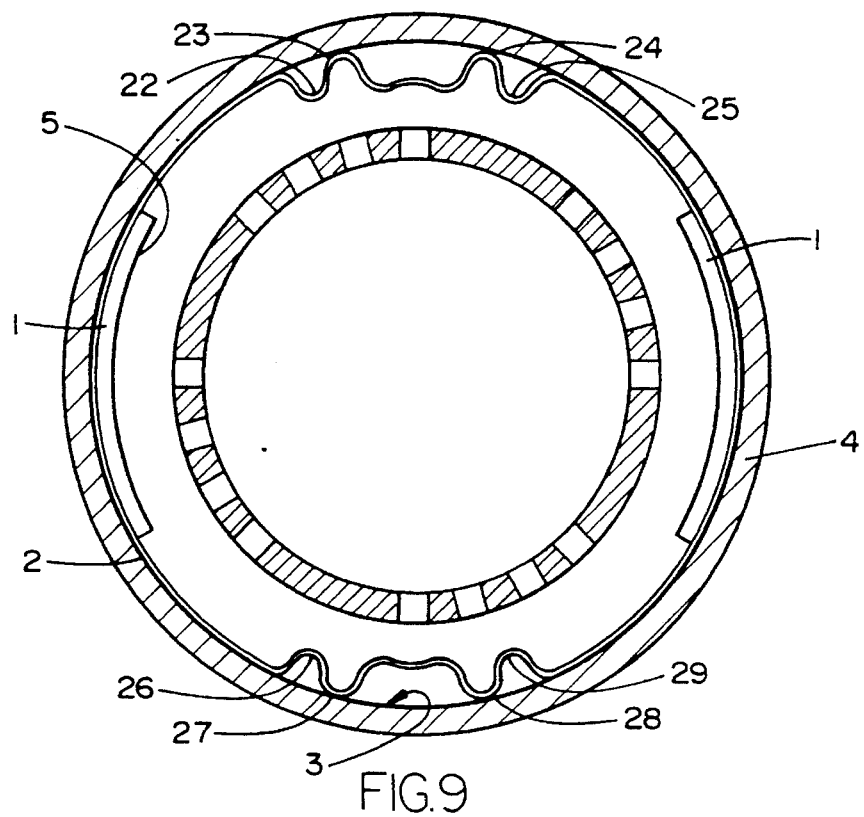
FIG. 9 is an axial sectional view of a tube illustrating the second embodiment of the method of FIG. 5, with the substrate and material installed.
Figure 10:
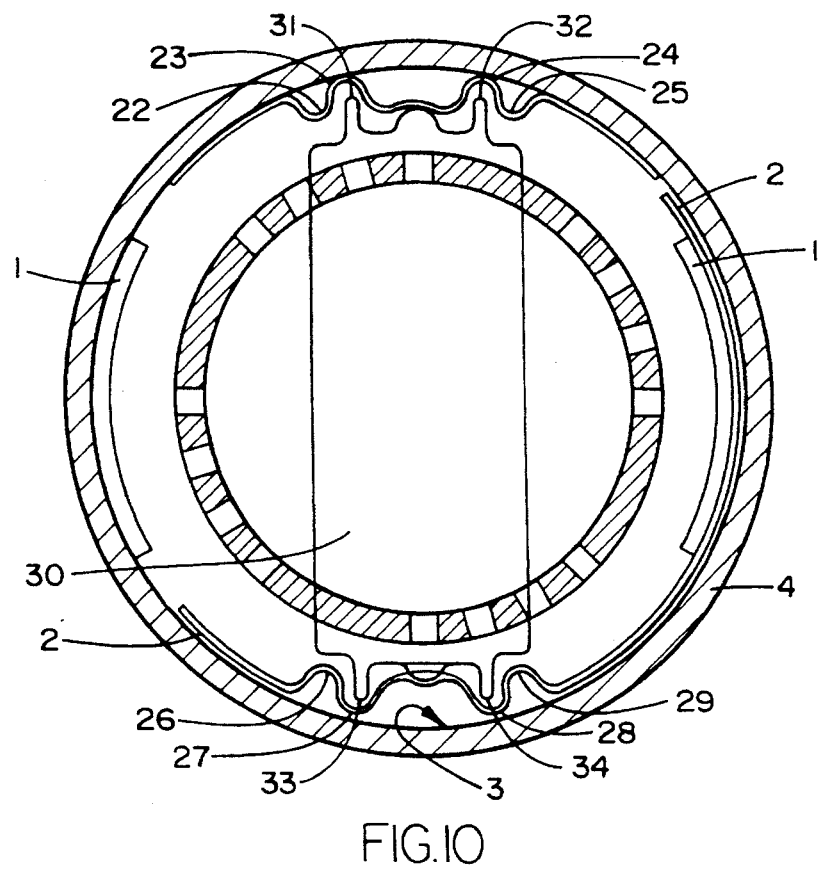
FIG. 10 is an axial sectional view of a tube illustrating the second embodiment of the method of FIG. 5, with the substrate and material unstressed.
Figure 12:
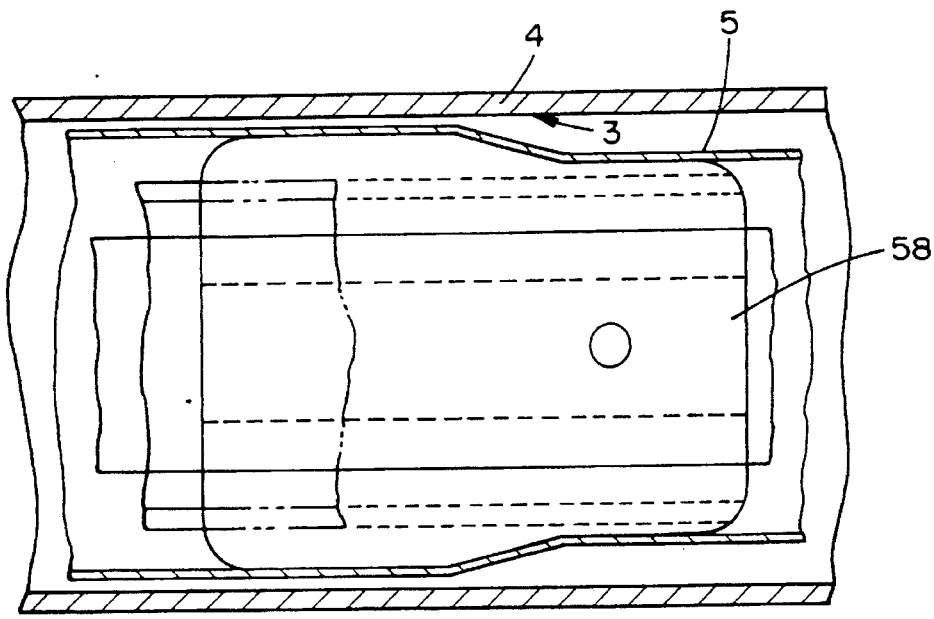
FIG. 12 is a longitudinal sectional view of FIG. 11.

The partly tubular configuration 5 is inserted substantially coaxially in the tube 4 (FIG. 5). The outer surface 7 of the tubular configuration 5 is placed in proximity with the inner surface 3 of the tube 4. A tool 30 (FIGS. 6, 7, 9 and 10) deforms the convolutes 22 to 29 by pressing them against the inner surface 3 of the tube 4. The tool 30 is guided by its side projections 31, 32, 33 and 34 tracking in the convolutes 23, 24, 27 and 28, respectively. The forces are balanced by deforming both pairs of double convolutes 22, 23 and 24, 25, and 26, 27 and 28, 29 simultaneously. These forces are equal and opposite, so the system is always in balance. The convolutes 22 to 29 yield (FIGS. 7, 8 and 10), causing a stress to develop that places the tubular configuration 5 in hoop compression.

The partly tubular configuration 5 is formed by shaping a thin metallic sheet into a tube. The seam along the tube length is then joined by seam welding or by forming a lap joint. The lap joint is provided by welding a second narrow strip along the edge of the partly tubular configuration 5. The opposite edge of the partly tubular configuration fits into the space between the narrow strip and the inner surface 3 of the tube 4.

The third embodiment of the method of affixing the material 1 on a thin metallic substrate 2 to the inner surface 3 of a tube 4 is shown in FIGS. 11 to 14C. The third embodiment is essentially the same as the first (FIGS. 1 to 4) and second embodiments (FIGS. 5 to 10), with the exception that in the third embodiment the substrate expanding features are such that the partly tubular configuration 5 has louver type notches 40 and 41 formed therein. Convolutes 42, 43 and 44 extend from the notch 40 and convolutes 45, 46 and 47 extend from the notch 41 in the partly tubular configuration 5. The convolutes 44 and 45 are engaged by a formed tab 48. On the diametrically opposite side, louver type notches 49 and 50 are formed in the partly tubular configuration 5. Convolutes 51, 52 and 53 extend from the notch 49 and convolutes 54, 55 and 56 extend from the notch 50 in the partly tubular configuration 5 (FIGS. 11, 13, 14A, 14B and 14C). The convolutes 53 and 54 are engaged by a formed tab 57 (FIGS. 11, 13, 14A, 14B and 14C).

Figure 11:
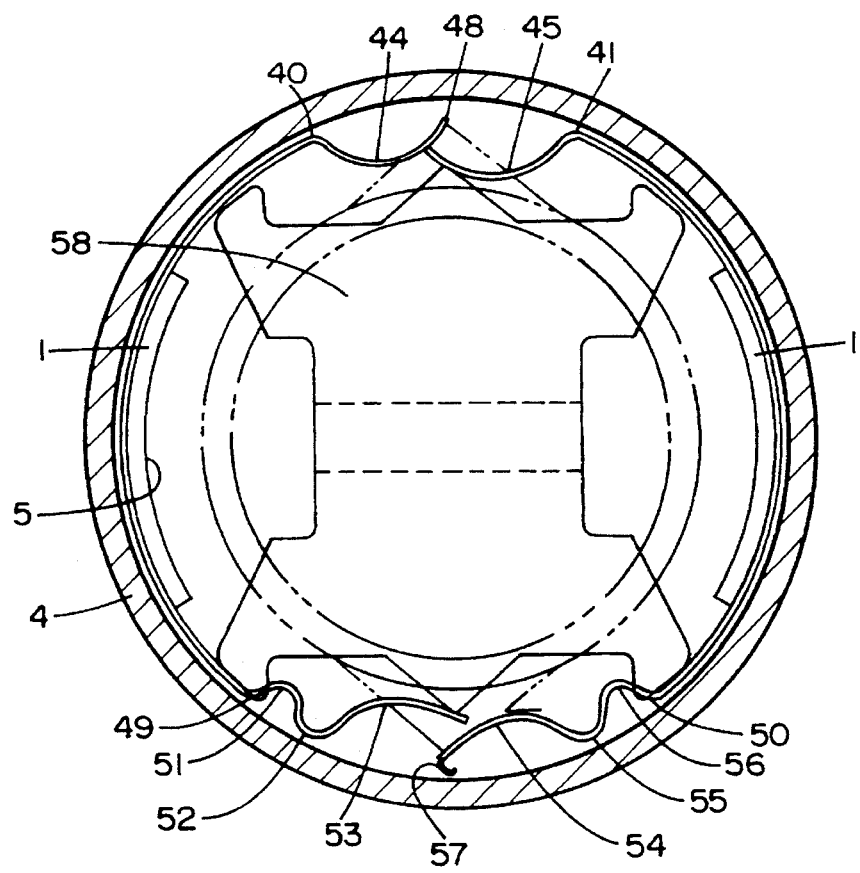
FIG. 11 is an axial sectional view of a tube illustrating a third embodiment of the method of the invention of affixing a material on a substrate to the inner surface of a tube, with the substrate, material and a compression stress tool in position.
Figure 13:
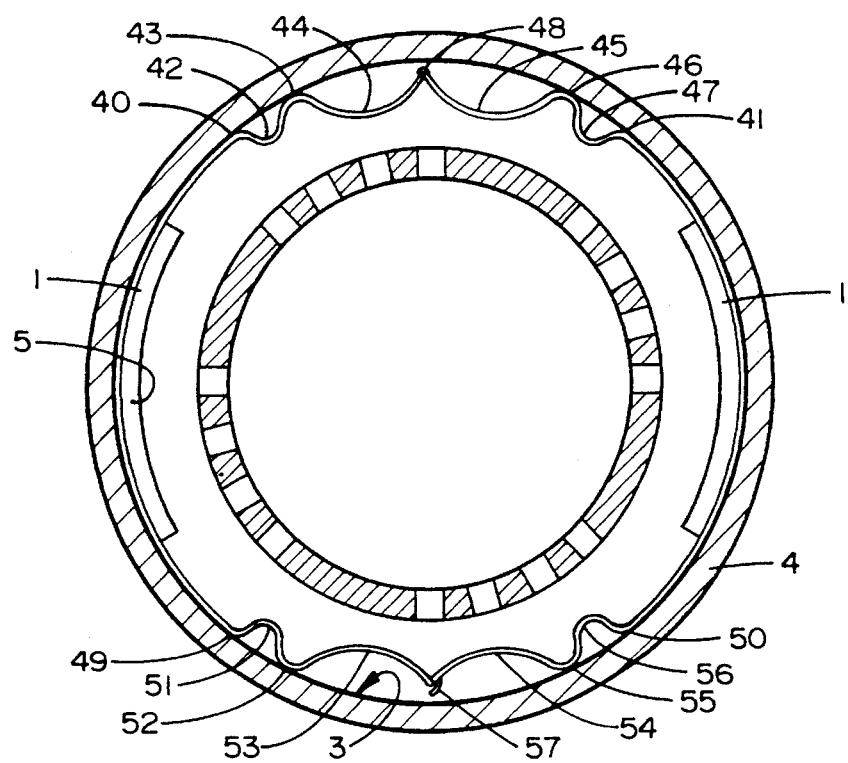
FIG. 13 is an axial sectional view of a tube illustrating the third embodiment of the method of FIG. 11, with the substrate and material installed.
Figure 14A:
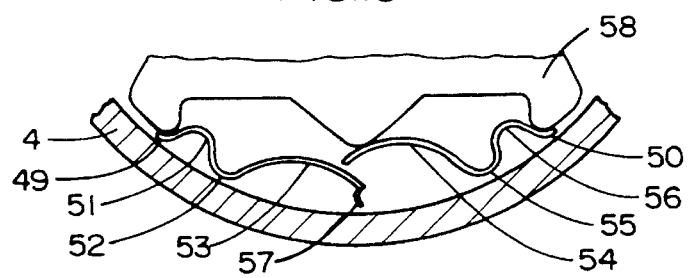
FIG. 14A is a view of part of an axial sectional view of a tube illustrating the first step of the third embodiment of the method of FIG. 11 with the compression stress tool in position.
Figure 14B:
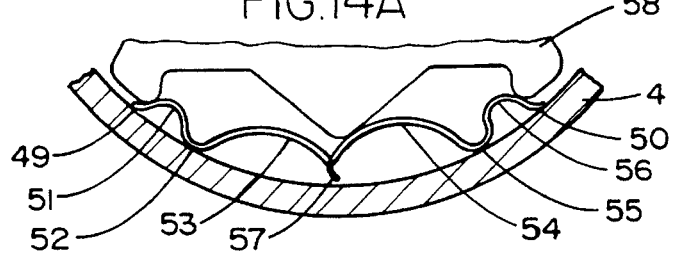
FIG. 14B is a view of part of an axial sectional view of a tube illustrating the second step of the third embodiment of the method of FIG. 11 with the compression stress tool applying force.
Figure 14C:
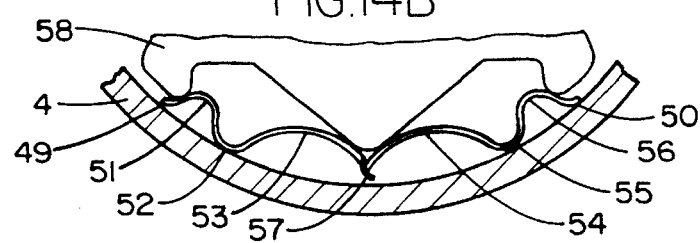
FIG. 14C is a view of part of an axial sectional view of a tube illustrating the third step of the third embodiment of the method of FIG. 11 with the compression stress tool applying force.

The partly tubular configuration 5 (FIG. 13) is placed in the tube 4, as shown in FIGS. 11 and 14A, and a tool 58 (FIGS. 11, 12, 14A, 14B and 14C) is moved through said partly tubular configuration. The tool 58 expands the tab 48 and 57 areas, urging the louvers 40, 41, 49 and 50 progressively toward the linking edges of the partly tubular configuration, as shown in FIGS. 11 and 14B. The convolutes 42, 43, 44, 45, 46 and 47, and 51, 52, 53, 54, 55 and 56 are simultaneously compressed by the operation of the tool 58. After the tool 58 has passed, the tabs 48 and 57 are locked into their louvers 40 and 41 and 49 and 50, respectively (FIGS. 13 and 14C), and the convolutes 42 to 47 and 51 to 56 provide compression forces which hold the tab 48 and 57 in place and retain the partly tubular configuration 5 expanded against the inner surface 3 of the tube 4.

The louvers 40, 41, 49 and 50 are disengaged by another tool (not shown in the FIGS.), which is moved through the partly tubular configuration 5 and deforms the areas of the tabs 48 and 57.

Figure 15:
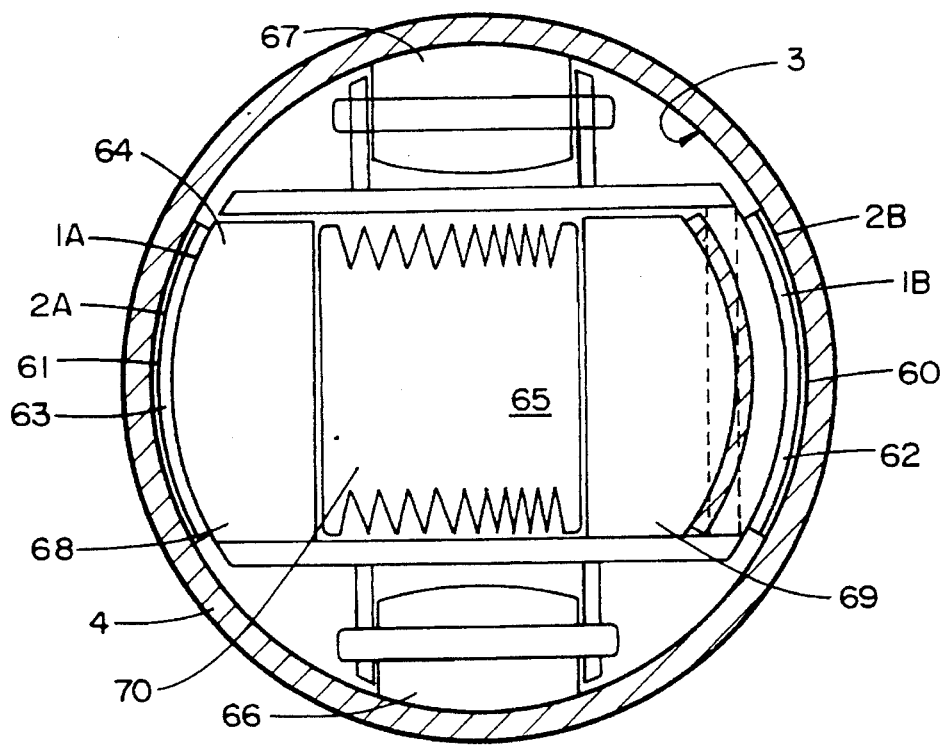
FIG. 15 is an axial sectional view of a tube illustrating a fourth embodiment of the method of the invention of affixing a material to the inner surface of a tube with a compression tool in position.
Figure 16:
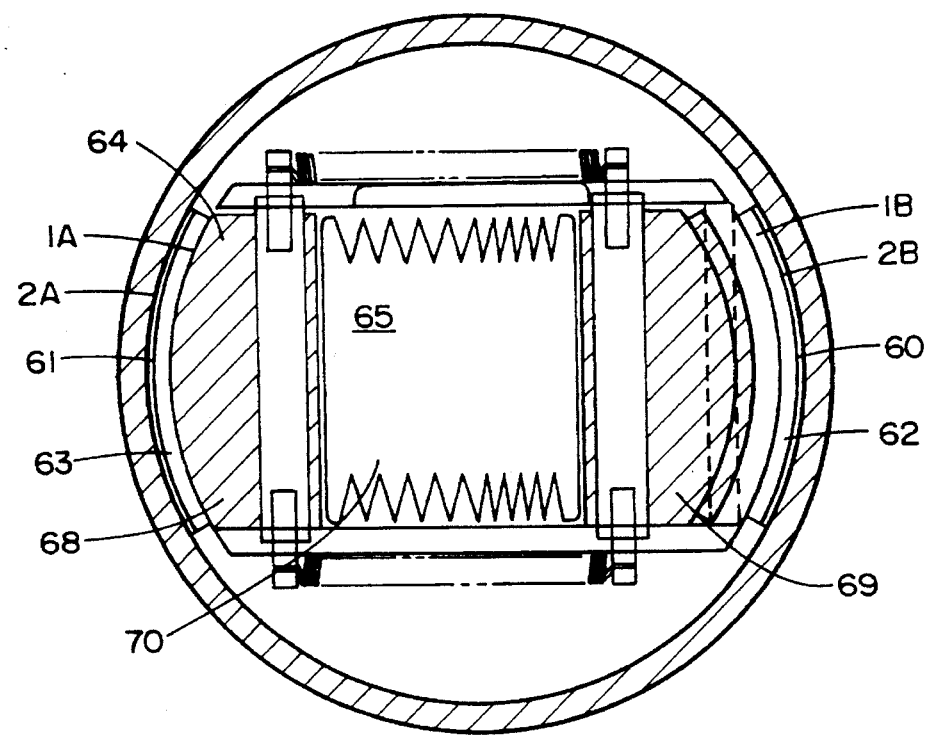
FIG. 16 is an axial sectional view of a tube illustrating the fourth embodiment of the method of FIG. 15, with the substrate and material on the inner surface of the tube and the compression tool applying force.
Figure 17:
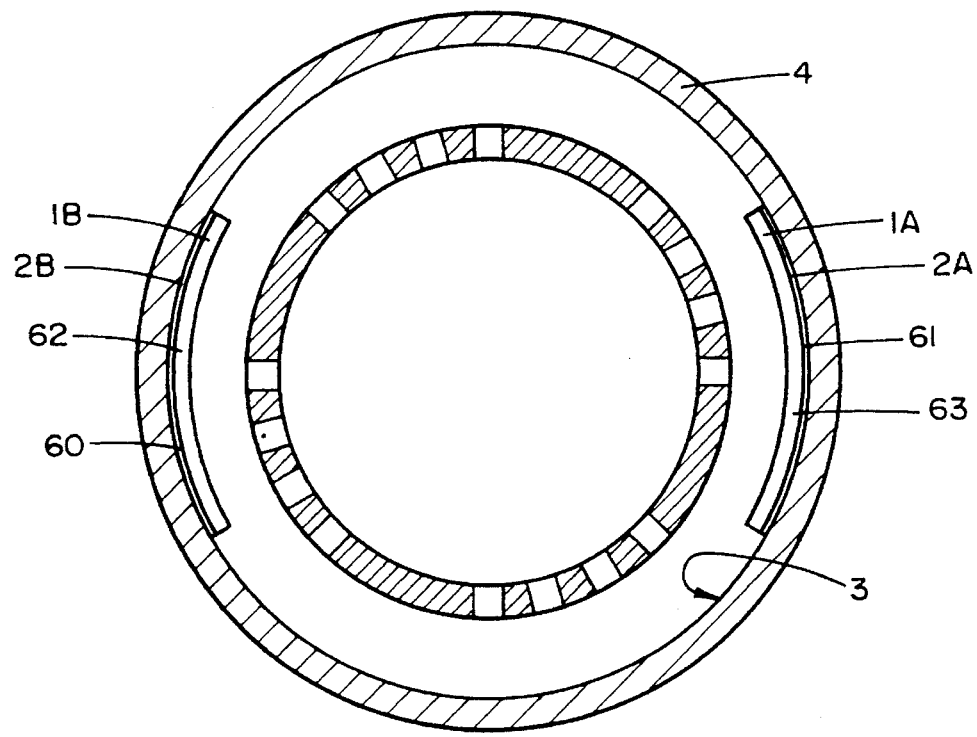
FIG. 17 is an axial sectional view of a tube illustrating the fourth embodiment of the method of FIG. 15 with the substrate and material installed.

The fourth embodiment of the method of affixing the material 1 on a thin metallic substrate 2 to the inner surface 3 of a tube 4 is shown in FIGS. 15 to 18. In the fourth embodiment, the substrate 2 and material 1 are formed into a pair of covered sections 60, 61 and 62, 63, respectively (FIGS. 15 to 17). The curved sections 60, 62 and 61, 63 are shaped to approximate the inner surface 3 of the tube 4 and are in spaced diametrically opposite relation (FIGS. 15 to 17).

A tool 64 (FIGS. 15 and 16) is used to position the curved sections 60, 62 and 61, 63 in the tube 4. When the curved sections 60, 62 and 61, 63 have been positioned, the tool 64 presses said sections against the inner surface 3 of the tube 4 by bellows action (FIGS. 15 and 16). Adhesive which was initially applied to the surface of the substrate 2 opposite its surface to which the material 1 is bonded is then effective in adhering the curved sections 60, 62 and 61, 63 to the inner surface 3 of the tube 4. After the adhesive has cured, the tool 64 releases the holding pressure and is moved out of the tube 4. The sections 60, 62 and 61, 63 of the substrate 2 and material 1 are then left adhered to the inner surface 3 of the tube 4, as shown in FIG. 17.

Figure 18:
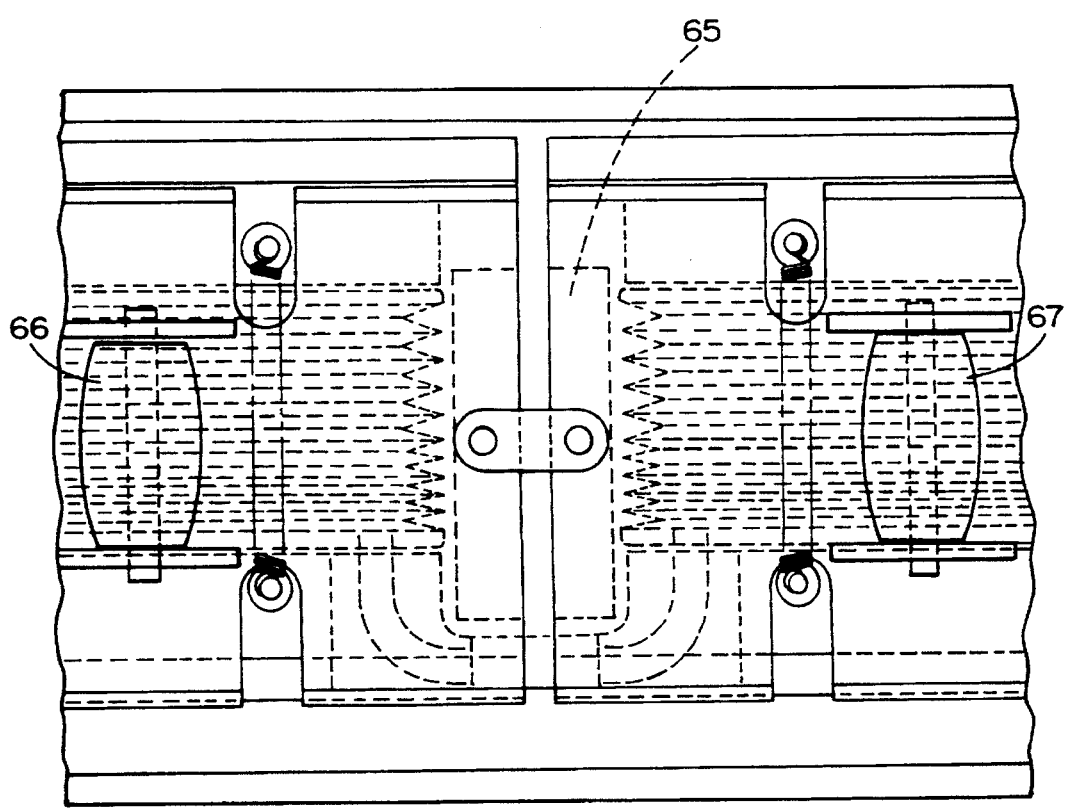
FIG. 18 is a view of the compression tool used in the fourth embodiment of the method of the invention.
Figure 19:
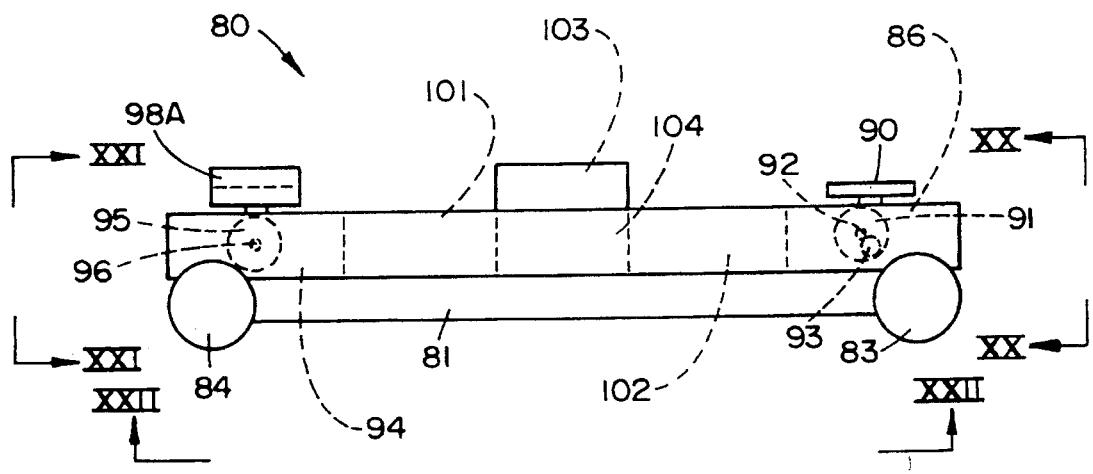
FIG. 19 is a view of the first embodiment of the material applicator device of the invention.
Figure 20:
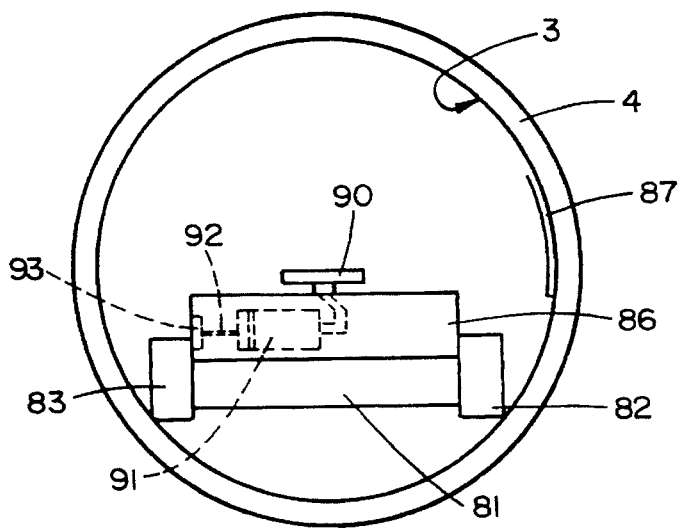
FIG. 20 is a view, taken along the lines XX—XX, of FIG. 19.
Figure 21:
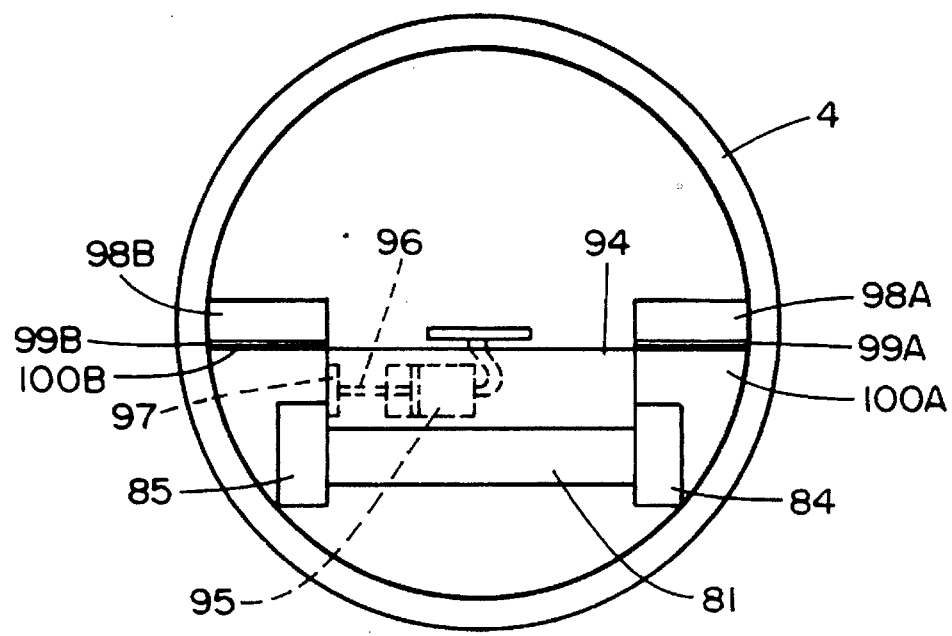
FIG. 21 is a view, taken along the lines XXI—XXI, of FIG. 19.
Figure 22:
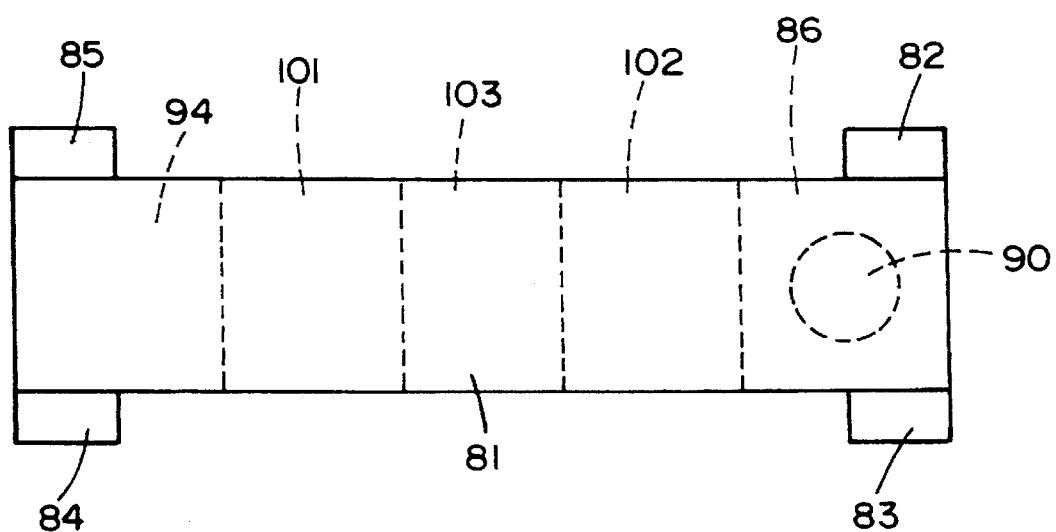
FIG. 22 is a view, taken along the lines XXII—XXII, of FIG. 19.
Figure 23:
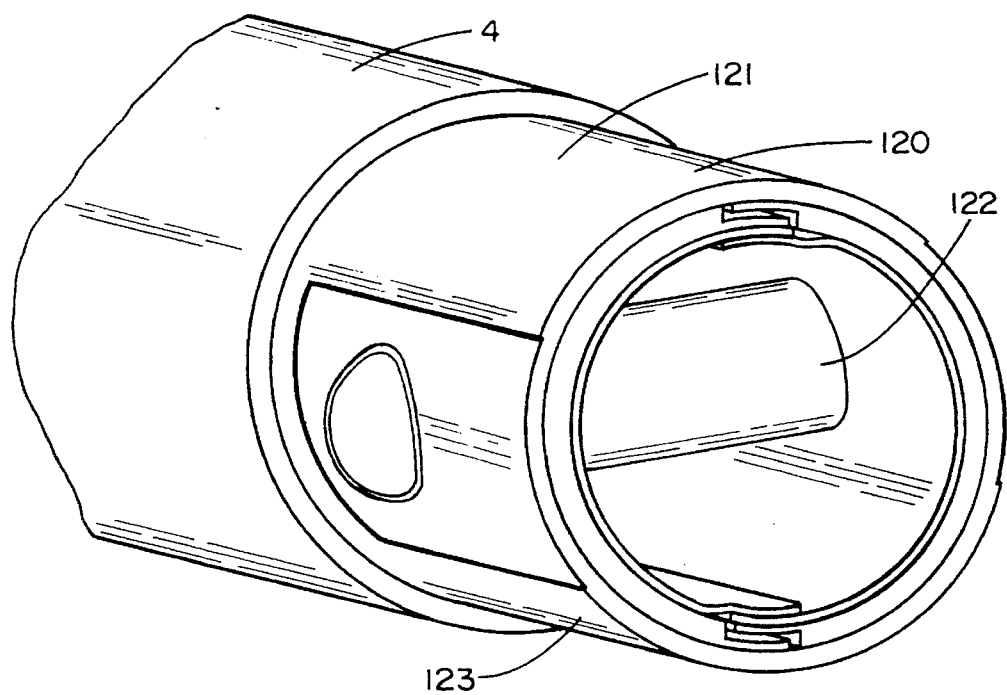
FIG. 23 is a perspective view of the second embodiment of the material applicator device of the invention.

The positioning tool 64, used in performing the method of FIGS. 15 to 18, has a carriage 65 on wheels 66 and 67 upon which it travels within the tube 4 (FIGS. 15 and 18). The carriage 65 is guided by a pair of guides in a manner whereby carriers 68 and 69 (FIGS. 15 and 16) on opposite sides of said carriage move in directions opposite each other. This motion is produced when a bellows 70 mounted on the carriage 65 between the carriers 68 and 69 is pressurized, as shown in FIGS. 15 and 16. The equal and opposite pressure on the carriers 68 and 69 maintains a balanced force system.

In the fourth embodiment, the tool 64 retains the substrate 2 on sets of pins (now shown in the FIGS.) which protrude from surfaces of the carriers 68 and 69 and grip the gas-absorbent material 1. The fourth embodiment of the method of the invention may also be effected with one curved section, rather than two. In such case, the non-utilized carrier would merely press directly on the inner surface 3 of the tube 4.

The first embodiment of the material applicator device 80 of the invention is shown in FIGS. 19 to 22. The device 80 has a carriage 81 on wheels 82, 83, 84 and 85 which moves forward and backward through the tube 4. The carriage 81 may be self-propelled by any suitable type of motor (not shown in the FIGS.), or pushed or pulled manually through the tube 4. An adhesive unit 86 is mounted on the carriage 81 and dispenses adhesive 87 on the inner surface 3 of the tube 4 (FIG. 20) in controlled quantity to attain desired thickness. The adhesive unit 86 has an adhesive reservoir. The flow of adhesive is coordinated with the motion of the carriage 81 in order to assure that a correct volume of adhesive 87 is applied to the surface 3.

The adhesive unit 86 is similar in structure and operation to a caulking gun. More particularly, the adhesive 87 is stored in the portable reservoir configured as a disposable cartridge 91. The cartridge 91 is inserted in the adhesive unit 86. The adhesive 87 is forced out of the cartridge 91 by an axial plunger 92 which moves in coordination with the motion of the carriage 81. A ratchet linkage 93 is fed by rotation of one of the wheels 83 of the carriage 81 rolling in the tube 4. The ratchet linkage 93 is adjustable in order to maintain the correct flow of adhesive from the cartridge 91 via an adhesive unit 86 may be disposable with its cartridge 91 and spray head 90. This would avoid the need to clean the adhesive unit 86 after each use.

The gas-absorbent material 1, or sorbent, which is usually charcoal, is applied to the adhesive 87 dispensed on the inner surface 3 of the tube 4 by the adhesive unit 86. The material 1 is dispensed by a material unit 94 mounted on the carriage 81. The material unit 94 has a portable reservoir configured as a disposable cartridge 95 of material. The material 1 is forced out of the cartridge 95 by an axial plunger 96 which moves in coordination with the motion of the carriage 81. A ratchet linkage 97 is fed by rotation of one of the wheels of the carriage 81 rolling in the tube 4. The ratchet linkage 97 is adjustable in order to maintain the correct flow of material from the cartridge 95. The material unit 94 also has rollers 98A and 98B for pressing the material 1 into the adhesive 87 on the inner surface 3 of the tube 4 and for assisting in controlling the flow of material by limiting its flow from the cartridge 95.

The rollers 98A and 98B rotate only when they are pulled along the inner surface 3 of the tube 4 by the motion of the carriage 81. The thickness of material 1 applied is controlled by the size of the gaps 99A and 99B between the rollers 98A and 98B and control plates 100A and 100B, respectively. The size of the gaps 99A and 99B are adjustable. A heavy layer of material 1 is usually applied, so that said material in contact with the rollers 98A and 98B pushes said material in contact with the inner surface 3 of the tube 4 and its adhesive coating 87 into the adhesive layer.

The carriage 81 may be provided with a heating unit 101 of any suitable known type to assist curing of the adhesive 87. The carriage 81 may also be provided with a vacuum unit 102 for removing material which has not adhered to the inner surface 3 of the tube 4. Furthermore, an inspection unit 103 may be mounted on carriage 81 for inspecting the condition of the material 1 on the inner surface 3 of the tube 4. The inspection unit 103 may include an optical comparator 104 of any suitable known type to which an optical signal is fed by said unit. The optical comparator 104 has threshold values set. If sufficient coverage of the inner surface 3 is not detected, the optical comparator 104 provides a signal which may be optionally recorded with the optical signal related to the position in the tube 4. The data may then be reviewed for corrective action.

A short length, or section, of tubing or pipe may be used as a starting point and/or an ending point for the adhesive and material application device 80. The pipe sections would be positioned coaxially with the tube 4 adjacent the ends thereof. Part of a section of pipe is cut away to facilitate placing the device 80 in the pipe. This section of pipe is used for starting the adhesive and material flows from the device 80 prior to the entry of said device into the tube 4. The ending point section of pipe at the exit end of the tube 4 is used to stop the flow of adhesive and material from the device 80. Adhesive on the sections of pipe is then removed before it cures in order to enable reuse of said sections.

Figure 24:
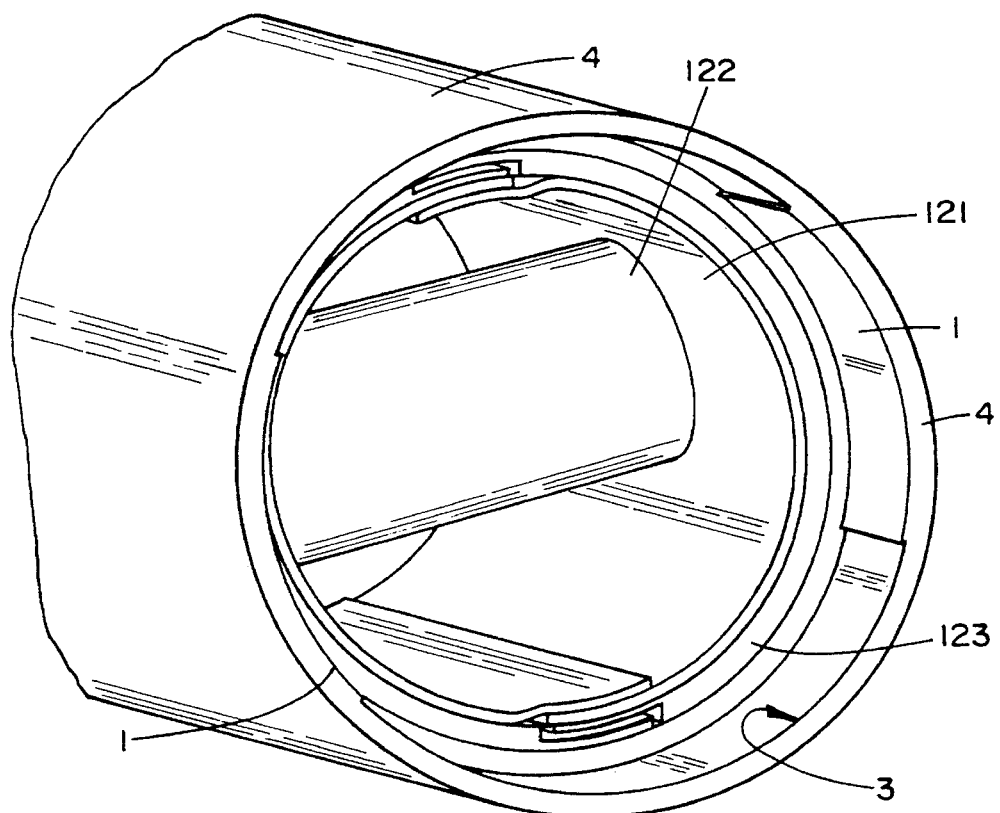
FIG. 24 is a perspective view, on an enlarged scale, of the second embodiment of FIG. 23.

The second embodiment of the adhesive and material applicator device 120 of the invention is shown in FIGS. 23 to 26. The device 120 comprises a hose 121 having an adhesive applying unit 122 at one end 123 of the hose which supplies the material 1 to the tube 4 (FIGS. 23 to 26). The hose 121 is filled with gas-absorbent material 1 such as, for example, charcoal, and supplies the material to the tube 4. The adhesive is applied to the inner surface 3 of the tube 4 by the adhesive applying unit 122 and said tube is filled with material 1 as the hose 121 is withdrawn from said tube. As the hose 121 is withdrawn from the tube 4, it leaves two strips of adhesive on the inner surface 3 of said tube. The material 1, which fills tube 4 behind the adhesive applying unit 122, adheres to these strips, as shown in FIG. 24.

Figure 25:
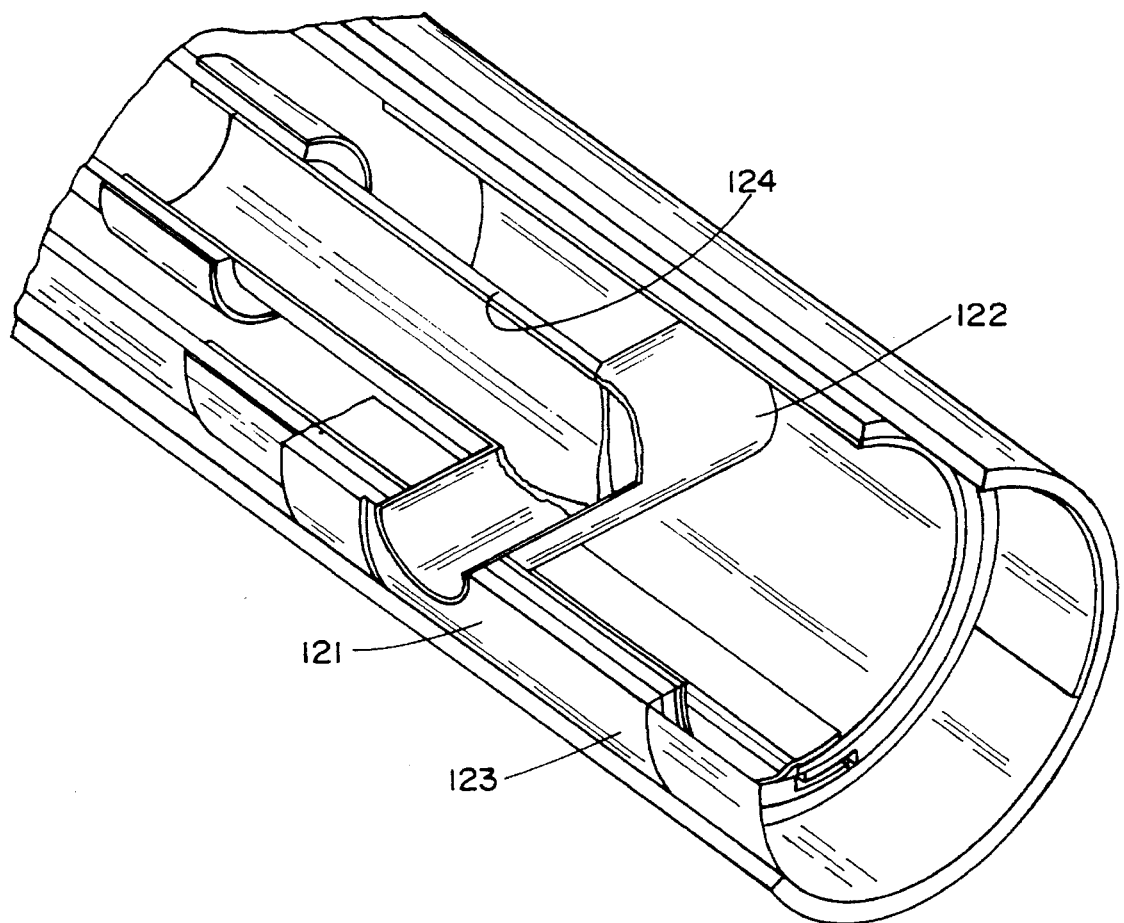
FIG. 25 is a perspective cutaway view of the second embodiment of FIG. 23.
Figure 26:
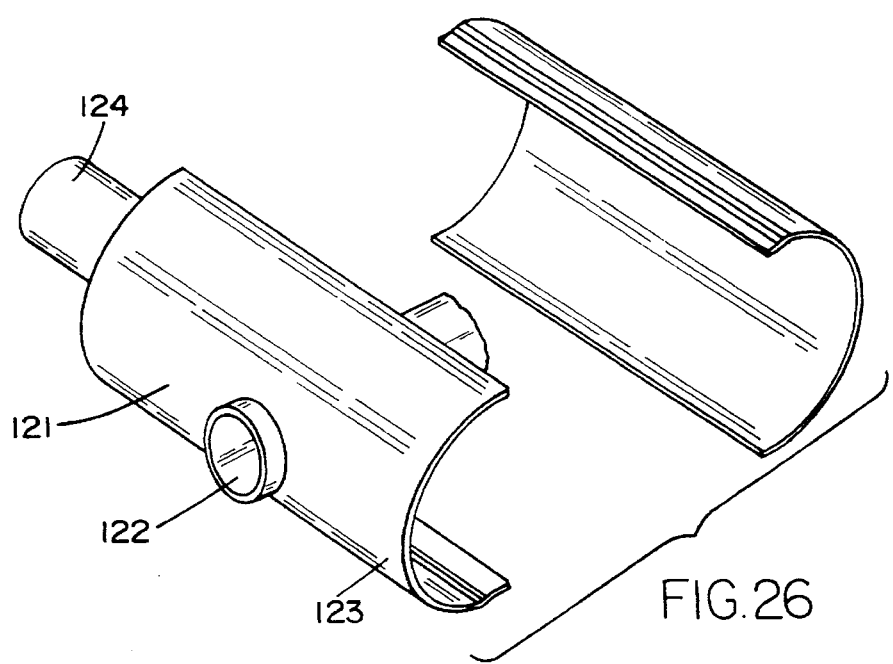
FIG. 26 is a perspective view of the hose 121 of the second embodiment of FIG. 23, split.

The adhesive is applied to the inner surface 3 of the tube 4 as the hose 121 and the adhesive applying unit 122 at the end of said hose are pulled through said tube. The adhesive is supplied to the adhesive applying unit 122 via a second, smaller diameter hose 124 which extends coaxially in the tube 121 (FIGS. 25 and 26). The adhesive applying unit 122 is of cylindrical configuration (FIGS. 23 to 26) and has a foam rubber outer sleeve forming a tight seal around it. The sleeve is undercut a depth equal to the thickness of adhesive desired. The flow of adhesive is metered to the rate of withdrawal of the hose 121.

The end of the tube 4 is sealed at the starting end, so that as the hose 121 is withdrawn, with the adhesive adhering to the inner surface 3 of said tube, a partial vacuum is created which assists the flow of material 1 out of said hose. The adhesive applying unit 122 is initially split, as shown in FIG. 26, so that it may be assembled with the hose 121. The adhesive applying unit 122 may be made sufficiently inexpensive that it may be disposable. The hose 121 may be wound up as it is withdrawn from the tube 4. Furthermore, the hose 121 is withdrawn from the tube 4 at a constant rate by a motor (not shown in the FIGS.). The adhesive is supplied to the adhesive applying unit 122 at an adjustable flow rate. The flow rate is set to obtain the desired thickness of adhesive coating and depends upon the rate of withdrawal of the hose 121 from the tube 4. The material 1 is blown into the hose 121 by a device which insures that said hose is always filled with said material.

A flexible tube with one end closed may be placed in the hose 121 (not shown in the FIGS.). The closed end of the flexible tube may be tied to the sealed end of the tube 4. Then, as the hose 121 is withdrawn from the tube 4, the flexible tube would be left in said hose surrounded by material 1. After the tube 4 is completely filled, the flexible tube would be pressurized. This would serve to compress the material 1 against the inner surface 3 of the tube 4, pressing it into the adhesive. Also, a flexible tube with its end open may be placed in the hose 121 (not shown in the FIGS.). After the tube 4 is filled, the flexible tube could be used to vacuum out material which has not adhered to the inner surface 3. This would be accomplished by applying a vacuum to the flexible tube and gradually withdrawing said flexible tube from the tube 4.

While several embodiments of the present invention have been shown and described, it is to be understood that many changes and modifications may be made thereunto without departing from the spirit and scope of the invention as defined in the appended claims.

What is claimed is:

1. A method of affixing a material on a substrate to the inner surface of a tube, said method comprising the steps of bonding the material to the substrate;

forming said substrate and said material into a substantially partly tubular configuration having an inner surface and an outer surface, said material being on the inner surface;

shaping said partly tubular configuration in a manner whereby said partly tubular configuration is expandable in diameter;

inserting said partly tubular configuration substantially coaxially into said tube with the outer surface of said partly tubular configuration in proximity with said inner surface of said tube, wherein said tube is a bore tube of magnets for a superconducting supercollider; and applying hoop compression stress to said inner surface of said partly tubular configuration, thereby forcing said partly tubular configuration against said inner surface of said tube.

2. A method as claimed in claim 1, wherein a gas-absorbing material is bonded to said inner surface of said partly tubular configuration.

3. A method as claimed in claim 1, wherein said substrate is a thin metallic substrate.

4. A method as claimed in claim 2, wherein said material consists of charcoal, and further comprising the step of maintaining said bore tube at cryogenic temperature.

5. A method of pumping particles in a tube of a particle device, said method comprising the steps of bonding a gas-absorbent material to a substrate;

forming the substrate and the material into a substantially partly tubular configuration having an inner surface and an outer surface, said material being on the inner surface;

shaping the partly tubular configuration in a manner whereby said partly tubular configuration is expandable in diameter;

inserting said partly tubular configuration substantially coaxially into said tube with the outer surface of said partly tubular configuration in proximity with said inner surface of said tube; and applying hoop compression stress to said inner surface of said partly tubular configuration, thereby forcing said partly tubular configuration against said inner surface of said tube.

6. A method as claimed in claim 5, wherein said tube is the bore tube of magnets for a superconducting supercollider.

7. A method as claimed in claim 5, wherein said substrate is a thin metallic substrate.

8. A method as claimed in claim 6, wherein said gas-absorbent material consists of charcoal, and further comprising the step of maintaining said bore tube at cryogenic temperature.

9. A method as claimed in claim 5, wherein said partly tubular configuration is shaped with convolutions therein, thereby providing said partly tubular configuration with diametrical expandability.

10. A method as claimed in claim 5, wherein said partly tubular configuration is formed with louver type notches formed therein and convolutes extending from the notches, thereby providing said partly tubular configuration with diametrical expandability.

11. A method as claimed in claim 10, wherein said partly tubular configuration is formed with tabs engaging said convolutes for locking into said louver type notches.

* * * * *